United States Patent [19]

De Voe

[11] Patent Number: 5,927,791
[45] Date of Patent: Jul. 27, 1999

[54] AUXILIARY MOTORCYCLE WINDSHIELD

[76] Inventor: Robert J. De Voe, 68 Vernon St., Waterbury, Conn. 06708-3032

[21] Appl. No.: 09/195,955

[22] Filed: Nov. 19, 1998

[51] Int. Cl.$^6$ .................................................... B62J 17/04
[52] U.S. Cl. ............................................. 296/78.1; 296/85
[58] Field of Search ...................... 296/78.1, 85, 96.11, 296/96.13, 96.2, 97.12, 97.21

[56] References Cited

U.S. PATENT DOCUMENTS

| D. 273,288 | 4/1984 | Johnson ................................. D12/182 |
| 2,352,727 | 7/1944 | McMahon ................................. 296/84 |
| 3,462,188 | 8/1969 | Edgar ..................................... 296/78.1 |
| 4,019,774 | 4/1977 | Tsukahara et al. ..................... 296/78.1 |
| 4,082,345 | 4/1978 | Willey .................................... 296/78.1 |
| 4,695,096 | 9/1987 | Kincaid ................................... 296/417 |

FOREIGN PATENT DOCUMENTS

| 85666 | 9/1955 | Denmark ................................ 296/78.1 |
| 187813 | 11/1922 | United Kingdom .................... 296/85 |

*Primary Examiner*—D. Glenn Dayoan
*Assistant Examiner*—Paul Chenevert

[57] ABSTRACT

A rear passenger motorcycle windshield is provided including a transparent shield plate. Also included is a bracket assembly connected to the shield plate and adapted to be mounted to a motorcycle for being positioned between a front end of a seat thereof and a rear thereof thus being positioned behind a first rider and in front of a second rider.

6 Claims, 2 Drawing Sheets

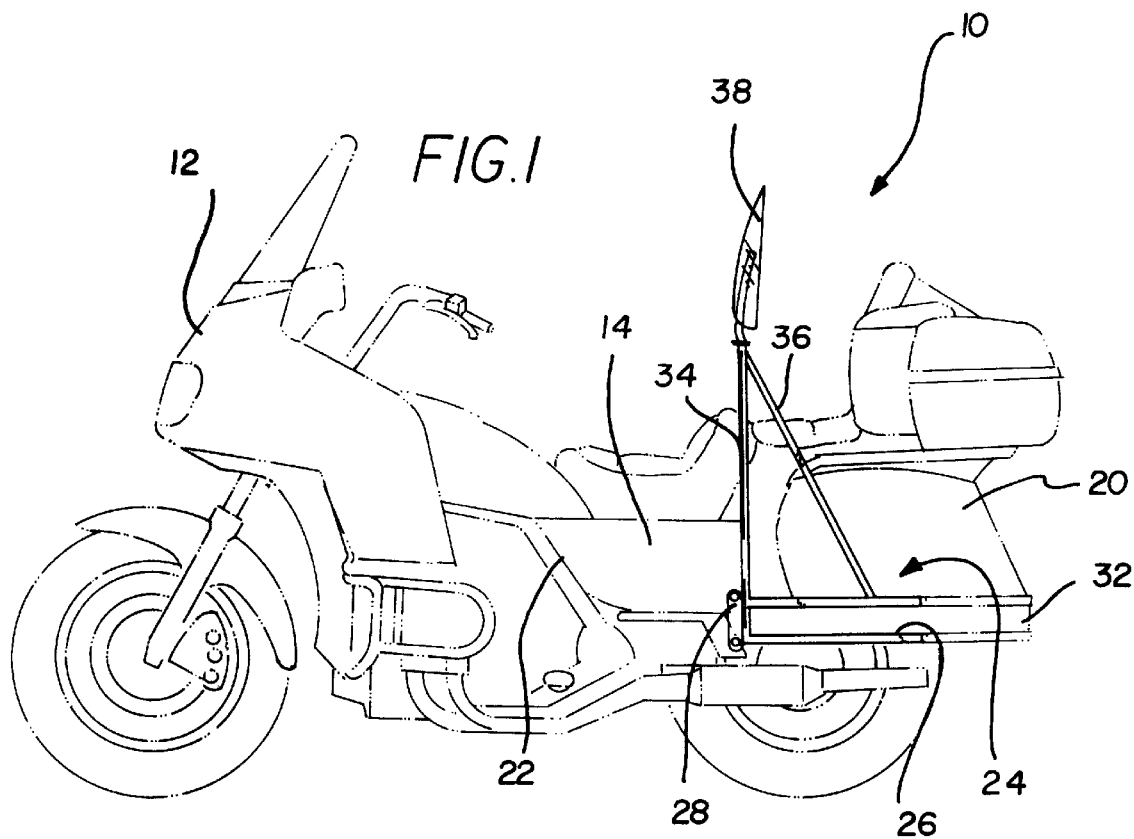
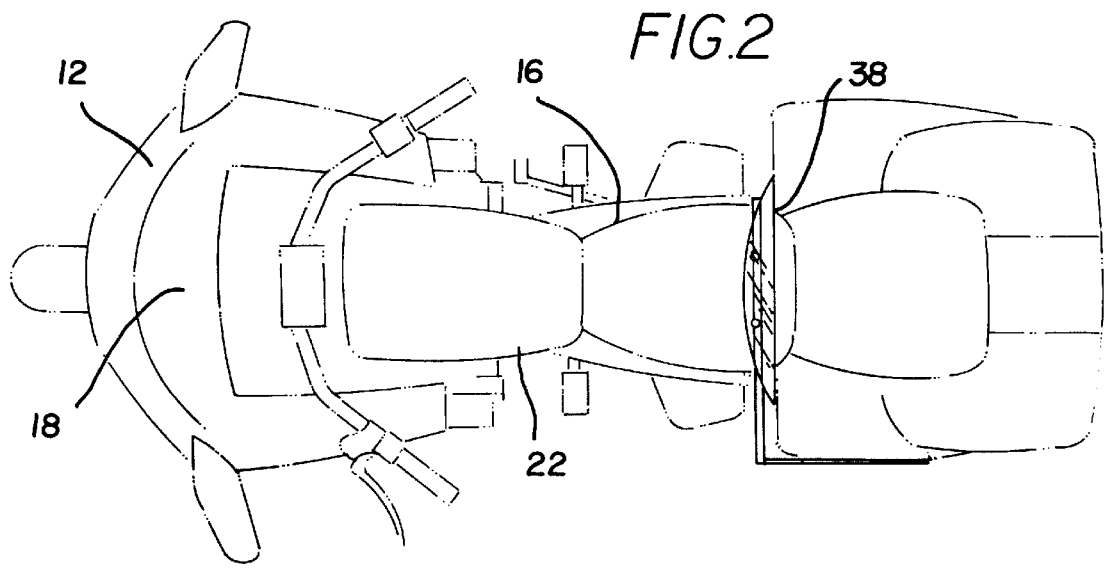

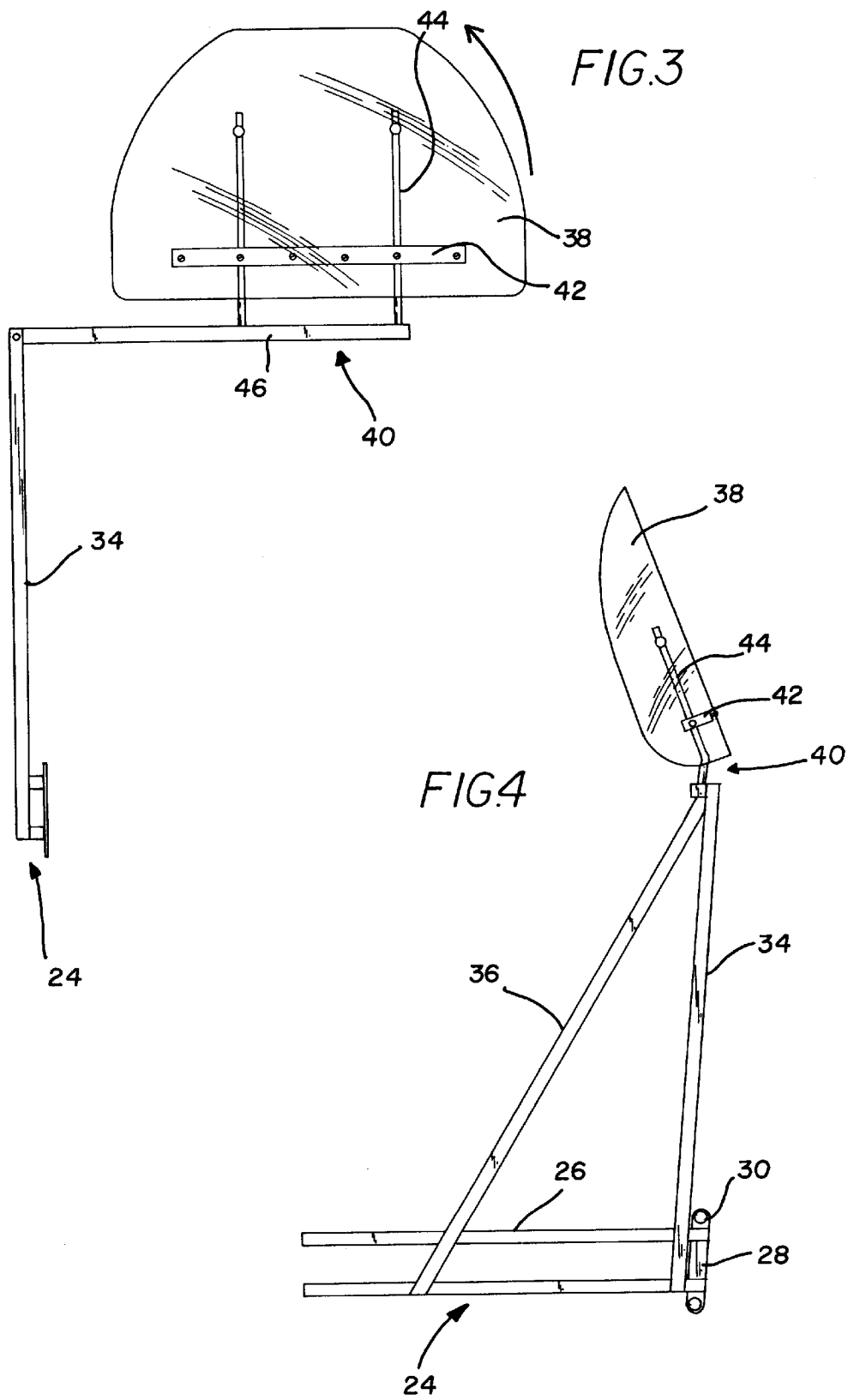

AUXILIARY MOTORCYCLE WINDSHIELD

BACKGROUND OF THE INVENTION

1. Field of the Invention

The present invention relates to motorcycle windshields and more particularly pertains to a new auxiliary motorcycle windshield for protecting an auxiliary passenger on a motorcycle.

2. Description of the Prior Art

The use of motorcycle windshields is known in the prior art. More specifically, motorcycle windshields heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 4,082,345; U.S. Pat. No. 4,695,096; U.S. Pat. No. 4,019,774; U.S. Pat. No. 3,462,188; U.S. Pat. No. 2,352,727; and U.S. Patent Des. 273,288.

In these respects, the auxiliary motorcycle windshield according to the present invention substantially departs from the conventional concepts and designs of the prior art, and in so doing provides an apparatus primarily developed for the purpose of protecting an auxiliary passenger on a motorcycle.

SUMMARY OF THE INVENTION

In view of the foregoing disadvantages inherent in the known types of motorcycle windshields now present in the prior art, the present invention provides a new auxiliary motorcycle windshield construction wherein the same can be utilized for protecting an auxiliary passenger on a motorcycle.

The general purpose of the present invention, which will be described subsequently in greater detail, is to provide a new auxiliary motorcycle windshield apparatus and method which has many of the advantages of the motorcycle windshields mentioned heretofore and many novel features that result in a new auxiliary motorcycle windshield which is not anticipated, rendered obvious, suggested, or even implied by any of the prior art motorcycle windshields, either alone or in any combination thereof.

To attain this, the present invention is adapted for use with a motorcycle having a main body with a top including a lower front seat and an upper rear seat. The motorcycle further has a front with a front windshield fixedly mounted thereon. The front of the motorcycle is further equipped with a front wheel pivotally mounted thereon for being maneuvered via a pair of handle bars. Lastly, the motorcycle further has a rear with a rear wheel and a pair of sides. Next provided is a bracket assembly including a pair of linear horizontally oriented members each having a length about ¼ that of the motorcycle. As shown in FIG. 4, a vertically oriented mounting bar is coupled between first ends of the horizontally oriented members for maintaining the same in parallel relationship. The mounting bar has a pair of ends each extending past the horizontal members with a bore formed therein. The mounting bar is thus adapted for being bolted to one of the sides of the motorcycle between the lower front seat and the upper rear seat. As such, the horizontal members each extend rearwardly along the corresponding side of the motorcycle. The bracket assembly further includes a linear vertical stanchion having a bottom end coupled to the first ends of the horizontal members and extending upwardly therefrom. Ideally, the stanchion extends upwardly to a level above the upper rear seat. For support purposes, a linear support is coupled between intermediate extents of the horizontally oriented members and a top end of the stanchion of the bracket assembly. Also included is a transparent shield plate with a concave configuration. A periphery of the transparent shield plate is defined by a elongated linear horizontally oriented bottom edge, a pair of short linear vertically oriented side edges, and a top edge. As shown in FIG. 3, such top edge has a linear horizontally oriented central extent and a pair of arcuate side extents. Finally, a shield pivot assembly includes a horizontal shield mounting strip coupled to an inner surface of the shield plate. This horizontal shield mounting strip remains adjacent to and in parallel relationship with the bottom edge of the shield plate, as shown in FIG. 3. A pair of vertical shield mounting strips are each coupled to the inner surface of the shield plate and at a central extent thereof to the horizontal shield mounting strip. Bottom ends of the present mounting strip extends downwardly beyond the bottom edge of the shield plate. A linear pivot bar is coupled to bottom ends of the vertical shield mounting strips in perpendicular relationship therewith. As best shown in FIG. 3, an end of the pivot bar is pivotally coupled to the top end of the stanchion of the bracket assembly. The shield plate is thus adapted for pivoting about an axis in coplanar relationship with the horizontally oriented members of the bracket assembly. In use, the shield may thus be selectively positioned between a first orientation laterally disposed with respect to the top of the motorcycle. In this orientation, a user is permitted to mount the upper rear seat of the motorcycle. The shield plate is further transferable to a second orientation positioned above the top of the motorcycle, thereby protecting a user seated on the upper rear seat of the motorcycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new auxiliary motorcycle windshield apparatus and method which has many of the advantages of the motorcycle windshields mentioned heretofore and many novel features that result in a new auxiliary motorcycle windshield which is not anticipated, rendered obvious, suggested, or even implied by any of the prior art motorcycle windshields, either alone or in any combination thereof.

It is another object of the present invention to provide a new auxiliary motorcycle windshield which may be easily and efficiently manufactured and marketed.

It is a further object of the present invention to provide a new auxiliary motorcycle windshield which is of a durable and reliable construction.

An even further object of the present invention is to provide a new auxiliary motorcycle windshield which is susceptible of a low cost of manufacture with regard to both materials and labor, and which accordingly is then susceptible of low prices of sale to the consuming public, thereby making such auxiliary motorcycle windshield economically available to the buying public.

Still yet another object of the present invention is to provide a new auxiliary motorcycle windshield which provides in the apparatuses and methods of the prior art some of the advantages thereof, while simultaneously overcoming some of the disadvantages normally associated therewith.

Still another object of the present invention is to provide a new auxiliary motorcycle windshield for protecting an auxiliary passenger on a motorcycle.

Even still another object of the present invention is to provide a new auxiliary motorcycle windshield that includes a transparent shield plate. Also included is a bracket assembly connected to the shield plate and adapted to be mounted to a motorcycle for being positioned between a front end of a seat thereof and a rear thereof thus being positioned behind a first rider and in front of a second rider.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new auxiliary motorcycle windshield according to the present invention.

FIG. 2 is a top view of the present invention.

FIG. 3 is a rear view of the present invention removed from the motorcycle.

FIG. 4 is a side view of the present invention removed from the motorcycle.

DESCRIPTION OF THE PREFERRED EMBODIMENT

With reference now to the drawings, and in particular to FIGS. 1 through 4 thereof, a new auxiliary motorcycle windshield embodying the principles and concepts of the present invention and generally designated by the reference numeral 10 will be described.

The present invention, designated as numeral 10, is adapted for use with a motorcycle 12 having a main body 14 with a top 16 including a lower front seat and an upper rear seat. The motorcycle further has a front 18 with a front windshield fixedly mounted thereon. The front of the motorcycle is also equipped with a front wheel pivotally mounted thereon for being maneuvered via a pair of handle bars. Lastly, the motorcycle further has a rear 20 with a rear wheel and a pair of sides 22.

Next provided is a bracket assembly 24 including a pair of linear horizontally oriented members 26 each having a length about ¼ that of the motorcycle. As shown in FIG. 4, a vertically oriented mounting bar 28 is coupled between first ends of the horizontally oriented members for maintaining the same in parallel relationship. The mounting bar has a pair of ends each extending past the horizontal members with a bore 30 formed therein. The mounting bar is thus adapted for being bolted to one of the sides of the motorcycle between the lower front seat and the upper rear seat. As such, the horizontal members each extend rearwardly along the corresponding side of the motorcycle. Ideally, such horizontal members serve to constrain a conventional protruding portion 32 of the motorcycle. In the alternative, the horizontal members may also be bolted or otherwise attached to the body of the motorcycle. It should be noted that the horizontal members may be attached to either side of the motorcycle per the desires of the user.

The bracket assembly further includes a linear vertical stanchion 34 having a bottom end coupled to the first ends of the horizontal members and extending upwardly therefrom. Ideally, the stanchion extends upwardly to a level above the upper rear seat. For support purposes, a linear support 36 is coupled between intermediate extents of the horizontally oriented members and a top end of the stanchion of the bracket assembly. As shown in FIG. 3, the mounting bar is attached to an inner surface of the horizontally oriented members while the stanchion and support are mounted to an exterior surface of the horizontally oriented members.

Also included is a polycarbonate transparent shield plate 38 with a concave configuration. A periphery of the transparent shield plate is defined by an elongated linear horizontally oriented bottom edge, a pair of short linear vertically oriented side edges, and a top edge. As shown in FIG. 3, such top edge has a linear horizontally oriented central extent and a pair of arcuate side extents.

Finally, a shield pivot assembly 40 includes a flat horizontal shield mounting strip 42 coupled to an inner surface of the shield plate. This horizontal shield mounting strip remains adjacent to and in parallel relationship with the bottom edge of the shield plate, as shown in FIG. 3. A pair of tubular vertical shield mounting strips 44 are each coupled to the inner surface of the shield plate and at a central extent thereof to the horizontal shield mounting strip. Ideally, the tubular vertical shield mounting strips have a diameter of ⅜ of an inch. Bottom ends of the present mounting strip extends downwardly beyond the bottom edge of the shield plate. A linear pivot bar 46 is coupled to bottom ends of the vertical shield mounting strips in perpendicular relationship therewith.

As best shown in FIG. 3, an end of the pivot bar is pivotally coupled to the top end of the stanchion of the bracket assembly. The shield plate is thus adapted for pivoting about an axis in coplanar relationship with the horizontally oriented members of the bracket assembly. In use, the shield may be selectively positioned between a first orientation laterally offset with respect to the top of the motorcycle. In this orientation, a user is permitted to mount the upper rear seat of the motorcycle. The shield plate is further transferable to a second orientation positioned directly above the top of the motorcycle, thereby protecting a user seated on the upper rear seat of the motorcycle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle system comprising:
    a motorcycle including a main body with a top having a lower front seat and an upper rear scat, a front with a front windshield fixedly mounted thereon and a front wheel pivotally mounted thereon for being maneuvered via a pair of handle bars, a rear with a rear wheel, and a pair of sides;
    a bracket assembly including a pair of linear horizontally oriented members each having a length about ¼ that of the motorcycle and a vertically oriented mounting bar coupled between first ends of the horizontally oriented members for maintaining the same in parallel relationship, the mounting bar having a pair of ends each extending past the horizontal members with a bore formed therein and adapted for being bolted to one of the sides of the motorcycle between the lower front seat and the upper rear seat such that the horizontal members each extend rearwardly along the corresponding side of the motorcycle, the bracket assembly further including a linear vertical stanchion having a bottom end coupled to the first ends of the horizontal members and extending upwardly therefrom to a level above the upper rear seat, wherein a linear support is coupled between intermediate extents of the horizontally oriented members and a top end of the stanchion of the bracket assembly;
    a transparent shield plate with a concave configuration and a periphery defined by an elongated linear horizontally oriented bottom edge, a pair of short linear vertically oriented side edges, and a top edge with a linear horizontally oriented central extent and a pair of arcuate side extents; and
    a shield pivot assembly including a horizontal shield mounting strip coupled to an inner surface of the shield plate adjacent to and in parallel relationship with the bottom edge thereof, a pair of vertical shield mounting strips each coupled to the inner surface of the shield plate and at a central extent thereof to the horizontal shield mounting strip in perpendicular relationship therewith such that bottom ends thereof extend downwardly beyond the bottom edge of the shield plate, and a linear pivot bar coupled to bottom ends of the vertical shield mounting strips in perpendicular relationship therewith, wherein an end of the pivot bar is pivotally coupled to the top end of the stanchion of the bracket assembly for pivoting about an axis in coplanar relationship with the horizontally oriented members of the bracket assembly to be selectively positioned between a first orientation laterally disposed with respect to the top of the motorcycle thereby allowing a user to mount the upper rear seat of the motorcycle and a second orientation positioned above the top of the motorcycle thereby protecting a user seated on the upper rear seat of the motorcycle.

2. A rear passenger motorcycle windshield comprising:
    a transparent shield plate; and
    a bracket assembly connected to the shield plate and adapted for being mounted to a motorcycle for being positioned between a front end of a seat thereof and a rear end thereof for being positioned behind a first rider and in front of a second rider.

3. A rear passenger motorcycle windshield as set forth in claim 2 wherein the bracket assembly is attached to a side of the motorcycle.

4. A rear passenger motorcycle windshield as set forth in claim 2 wherein the shield plate is pivotally coupled to the bracket assembly.

5. A rear passenger motorcycle windshield as set forth in claim 4 wherein the shield plate is pivotally coupled to the bracket assembly about an axis in parallel with a longitudinal axis of the motorcycle.

6. A rear passenger motorcycle windshield as set forth in claim 2 wherein the bracket assembly includes a pair of horizontally oriented members adapted for being positioned along a side of the motorcycle.

\* \* \* \* \*